United States Patent [19]
Short

[11] Patent Number: 5,241,687
[45] Date of Patent: Aug. 31, 1993

[54] PHASE CONTROLLING PHASE OF LOCAL SUBCARRIER SIGNAL TO CORRESPOND TO TRANSMITTED PILOT SIGNAL

[75] Inventor: William R. Short, Ashland, Mass.

[73] Assignee: Bose Corporation, Framingham, Mass.

[21] Appl. No.: 655,790

[22] Filed: Feb. 14, 1991

[51] Int. Cl.⁵ ............................................. H04B 1/16
[52] U.S. Cl. .................................. 455/45; 455/180.3; 455/214; 455/263; 455/265; 455/304; 455/312; 329/325; 329/336; 329/359; 329/360; 381/4; 381/13
[58] Field of Search ............... 455/45, 65, 67.6, 180.3, 455/184.1, 202, 214–215, 265, 263, 304, 312; 329/317, 324, 325, 336, 356, 359, 360; 381/4, 13

[56] References Cited
U.S. PATENT DOCUMENTS

| | | | |
|---|---|---|---|
| 3,328,529 | 6/1967 | Heald | 381/4 |
| 3,701,948 | 10/1972 | McAuliffe | 455/202 |
| 3,714,595 | 1/1973 | Denenberg et al. | 381/4 |
| 4,002,991 | 1/1977 | Ogita | 455/202 |
| 4,633,496 | 12/1986 | Ohtaki et al. | 381/4 |
| 4,821,322 | 4/1989 | Bose | 381/13 |
| 4,881,274 | 11/1989 | Tazaki et al. | 381/13 |
| 5,046,129 | 9/1991 | Short | 381/13 |

FOREIGN PATENT DOCUMENTS
0197933 11/1983 Japan .................................. 381/13

Primary Examiner—Reinhard J. Eisenzopf
Assistant Examiner—Andrew Faile
Attorney, Agent, or Firm—Fish & Richardson

[57] ABSTRACT

Apparatus for demodulating information signals frequency-modulated on an RF carrier signal carrying spectral components within the audio frequency range, a pilot carrier signal having an imparted phase shift from the phase of the transmitted pilot carrier signal, and amplitude-modulated spectral components having another imparted phase shift in a subcarrier channel frequency range above the audio frequency range. The apparatus includes a demodulator for demodulating the frequency-modulated information signals to provide a detected composite signal which includes a detected pilot carrier characterized by an imparted phase shift due to the effects of multipath reception, and detected amplitude modulated spectral components exhibiting another multipath induced phase shift. The apparatus also includes a source of a local subcarrier signal, a phase controller coupled to the source for controlling the phase of the local subcarrier signal to corresponding substantially to that of the transmitted pilot carrier signal, and a combiner for combining the local subcarrier signal with the detected composite signal to recover the information signal carried by the amplitude modulated spectral components.

19 Claims, 3 Drawing Sheets

PHASE CONTROLLING PHASE OF LOCAL SUBCARRIER SIGNAL TO CORRESPOND TO TRANSMITTED PILOT SIGNAL

This invention relates to improved apparatus and methods for decoding the stereo difference signal portion of a conventional FM stereo multiplex broadcast in the presence of multipath reception.

The transmitted stereo signal typically carries a sum signal corresponding to the sum of left and right audio signals, a 19 kHz pilot carrier and a difference signal balance modulated upon a 38 kHz suppressed carrier corresponding to the difference between the left and right signals. In stereo receivers circuitry demodulates a received FM stereo signal into these components. Circuitry doubles the demodulated 19 kHz pilot carrier to provide a 38 kHz reference signal that is mixed with the recovered balance modulated signal to provide the difference signal. The difference signal is then added to and subtracted from the sum signal to provide the left and right audio signals.

In general, the FM signal reaches the receiving antenna by several parallel paths. Typically, there is a direct path, as well as several reflected paths, due to reflections from buildings, mountains, and the like. This condition is called multipath. Under multipath conditions, the received composite audio signal has increased noise, distortion, and other effects caused by the action of multipath on the FM signal. One significant effect is that the received composite audio signal undergoes phase shift that varies with the frequency of the modulating audio. This effect caused the pilot to undergo a different phase shift than that of the double sideband suppressed carrier (DSB-SC) stereo difference signal. Thus, when a conventional receiver uses the phase shifted pilot to regenerate a carrier for demodulating the DSB-SC stereo difference signal, that regenerated carrier will have a phase shift that is different from that of the signal to be demodulated. This difference causes the demodulated audio signal to be recovered with the incorrect amplitude. This amplitude error results in the stereo soundstage being reproduced with the incorrect perceived width. Further, if the receiver is moving, such as in a vehicle, multipath conditions are continually changing, resulting in a constantly changing stereo soundstage image.

One approach to reducing the effects of this problem is disclosed in U.S. Pat. No. 4,821,322. This patent disclosed a method of demodulating the stereo difference signal without using the pilot signal when the FM signal has been degraded by multipath. An improved receiver using this invention regenerates a demodulating carrier from the subcarrier itself during multipath degradation that has the same phase shift as the original subcarrier itself would have had if transmitted with the sidebands.

A report entitled A *Theoretical and Experimental Study of Noise and Distortion in the Reception of FM Signals* by Amar G. Bose and William R. Short, published by the MIT Research Laboratory of Electronics, explains the theory of multipath distortion. This report shows that a significant effect of multipath is the generation of distortion signals added to the original composite audio signal that are in quadrature with the original audio. The amplitude of the quadrature distortion products is a function of many parameters, including the frequency of the modulating audio. Thus, the amplitude of the quadrature distortion products at the pilot frequency is different from the amplitude of the quadrature distortion products at the subcarrier frequency, explaining the difference between pilot frequency and subcarrier frequency phase shifts in the presence of multipath.

This report shows why undesired signal components remain in a signal processed according to the aforesaid mentioned patent. Even if the local regenerated carrier used for demodulating the stereo difference signal has the same phase as the received DSB-SC subcarrier, the stereo difference signal will not be correctly recovered. Multipath effects create quadrature distortion components which are added to the desired signal resulting in an apparent phase shift. Demodulating the received DSB-SC subcarrier with a regenerated carrier of the same phase causes some of the quadrature distortion products to be demodulated as well as the desired difference channel audio signal. As a result this method of reducing the effects of multipath introduces additional noise due to the demodulation of the quadrature distortion products.

It is an object of this invention to provide improved apparatus and techniques for reducing the effects of multipath transmissions.

The process according to the invention reduces amplitude errors and noise and distortion from multipath-induced quadrature distortion products by maintaining the phase of the local regenerated carrier with the phase of the pilot (and thus the DSB-SC subcarrier) as if the pilot were being received in the same receiver location in the absence of multipath. This phase relationship is maintained regardless of the actual phase of the received pilot, which can change by more than 90 degrees in the presence of multipath, as shown in the report. Thus, the system maintains phase lock between the regenerated local carrier and the pilot as generated at the transmitter and time delayed by the transit time from transmitter to receiver. This phase lock is maintained regardless of phase changes in the received pilot and is allowed to change only as a result of changing path length time delays between transmitter and receiver for the path having the strongest RF level at the receiver antenna. Thus, even in the presence of multipath, the regenerated carrier remains substantially in phase with the desired signal and substantially in quadrature with the multipath induced quadrature distortion products. When the DSB-SC subcarrier is demodulated with a regenerated carrier having this phase, the desired difference channel audio signal is recovered with minimal recovery of the undesired quadrature distortion products.

Preferably, in the absence of multipath degradation, the process involves doubling the received pilot signal to provide the local subcarrier for demodulating the stereo difference signal to provide the difference channel audio signal.

The process includes detecting multipath degradation, such as by detecting out-of-band signals at the output of the FM detector, typically about 100 kHz; detecting AM on the received FM carrier; and detecting changes in amplitude of the 19 kHz pilot signal. Out-of-band noise detection is preferred because degradation may be detected more quickly.

According to the invention, the phase of the local subcarrier does not vary due to short phase variations in the phase of the received pilot signal resulting from changing multipath conditions. This feature may be embodied with a phase locked loop (PLL) frequency-doubler having an extremely long time constant for providing the local subcarrier in response to the received pilot signal, for example, by establishing a long time constant in the PLL loop filter. Thus, in the general case of a receiver which occasionally experiences multipath degradation, the PLL establishes the correct phase of the demodulating local subcarrier when multipath degradation is absent. During brief intervals of multipath degradation, the phase of the PLL output signal, and thus of the demodulating local subcarrier, changes so little that, in effect, it remains locked to the phase of the subcarrier and pilot signal at the transmitter.

The long time constant in the PLL may delay establishing lock to cause audible monophonic reception of a broadcast after a station is first tuned. The effect of this limitation may be reduced by using a PLL with a short time constant when tuning to allow quick phase lock and a long time constant after establishing phase lock allowing for reception improvements in regions of multipath.

If the receiver experiences multipath degradation for an extended duration, the phase of the PLL output will drift due to the phase shift of the received pilot caused by multipath. Within a period of time comparable to the length of the PLL time constant, there will be enough phase shift to cause significant multiplex decoding errors. Holding the value of the output signal of the time constant filter in the PLL when multipath degradation occurs reduces this phase drift during multipath degradation. Breaking the feedback loop of the PLL with a stable voltage-controlled oscillator (VCO) prevents the phase of the PLL output from drifting significantly during periods of multipath degradation, allowing correct multiplex decoding. Preferably, the receiver occasionally samples signals uncorrupted by multipath to sample the correct pilot phase and correct for any drifts in local subcarrier phase that occur during multipath degradation.

The invention is still useful when the receiver experiences continuous or lengthy multipath degradation, such as in a home, other stationary location or moving in a region of extended multipath degradation.

Then a local subcarrier source may comprise a closed loop servo system that senses and reduces the phase error of the local subcarrier. It is sufficient if the local subcarrier is more or less phase locked to the phase of the transmitted pilot signal. Perfect phase lock is not required, since the servo loop corrects any phase errors. A signal from a stable oscillator may energize a controllable phase shifter which shifts the phase by an amount dependent on the level of an applied control voltage to provide the local subcarrier for demodulating the stereo difference subcarrier. A phase error detector detects the phase error of the local subcarrier to provide the control voltage applied to the phase shifter to reduce the phase error.

One approach to detecting this phase error involves sensing the level of out-of-band noise at the output of the stereo difference channel demodulator. In the presence of multipath degradation, when the local subcarrier phase is incorrect, the difference channel demodulator demodulates the quadrature distortion components introduced by multipath transmission, resulting in out-of-band signals at the output of the demodulator, typically at frequencies around approximately 150 kHz. When the phase is correct, the quadrature components are absent, resulting in reduced amplitude out-of-band signals at the demodulator output. Thus, by detecting the level of out-of-band signals at the output of the demodulator and the sense of the error, it is possible to determine when the phase of the local subcarrier is correct.

One approach to determining the sense of the error is to dither the control voltage of the phase shifter with a dither signal at a known frequency, typically sinusoidally. The controllable phase shifter receiving the dithered control voltage emits a local subcarrier whose phase shifts at the rate of the dither signal frequency. As a result, in the presence of multipath degradation, the level of out-of-band noise at the demodulator output varies as the phase of the local subcarrier varies and is a minimum when the local subcarrier is in phase with the transmitted pilot signal.

Using a specific example, suppose the phase of the local subcarrier were allowed to vary sinusoidally at a 20 Hz rate. If the average phase error of the local subcarrier was positive or negative, then the level of out-of-band noise at the output of the demodulator would increase and decrease at a 20 Hz rate with an envelope of respective opposite phases relative to that of the 20 Hz dither signal. If the average phase error were nearly correct, the level of the out-of-band noise would vary at a 40 Hz rate, since it would increase on both the positive and negative peaks of the 20 Hz dither signal. Comparing the envelope phase with the dither signal provides an error signal indicating the direction for adjusting the local subcarrier to track that of the transmitted pilot signal.

Another method for determining the sense of the phase error is to provide first and second phase-shifted pilot signals by shifting the phase of the detected pilot signal by different amounts, demodulating the difference signal with the first and second phase-shifted pilot signals to provide first and second difference signals, and detecting the out-of-band noise in the first and second difference signals. The phase-shifted pilot signal used to demodulate the difference signal with more noise has a phase further from the phase of the transmitted pilot signal.

Other advantages and features will become apparent from the following specification when read in connection with the accompanying drawings in which.

Figure 1:
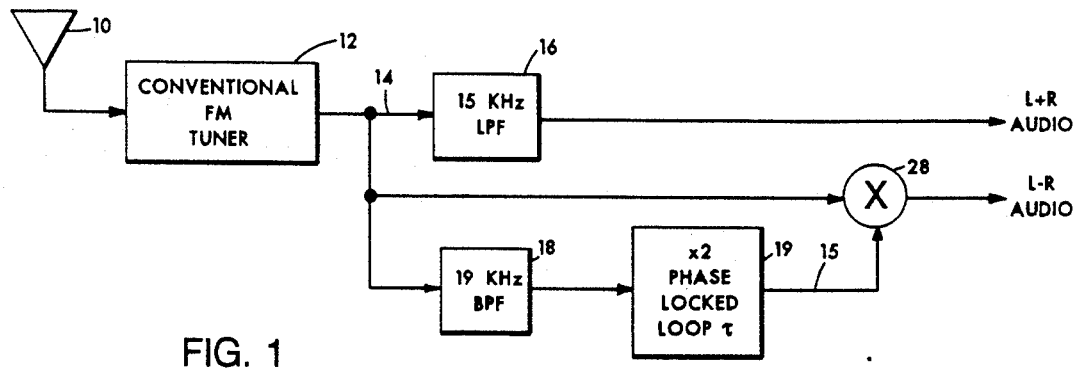
FIG. 1 is a block diagram of a first embodiment of the invention; a stereo FM receiver including a slow PLL.

Referring to FIG. 1, a stereo FM receiver according to the present invention includes a tuner 12 which demodulates an FM signal received by antenna 10 to provide a composite signal on line 14. Filters 16, 18 extract two components of the composite signal on line 14. Low pass filter 16, which typically has a cutoff frequency of 15 kHz, provides the sum of the left and right audio channels (L+R). A second bandpass filter 18 typically having a narrow passband at 19 kHz provides the pilot signal. A conventional FM receiver doubles this detected pilot signal to provide a local 38 kHz regenerated carrier signal to demodulate the DSB-SC difference signal on line 14.

In this embodiment of the invention, a doubling PLL 19 with a long time constant $\tau$ is used to generate the local subcarrier on line 15 that may change phase only after a time interval related to the time constant. This delay prevents intermittent multipath degradation of a short duration from significantly affecting the phase of the local subcarrier on line 15. This local subcarrier on line 15 is then applied to demodulator 28 to demodulate the DSB-SC difference signal on line 14 to provide the audio difference signal (L−R). (L+R) and (L−R) audio signals are summed and differenced to create left and right audio signals respectively which are reproduced by conventional power amplifiers and speakers.

Figure 2:
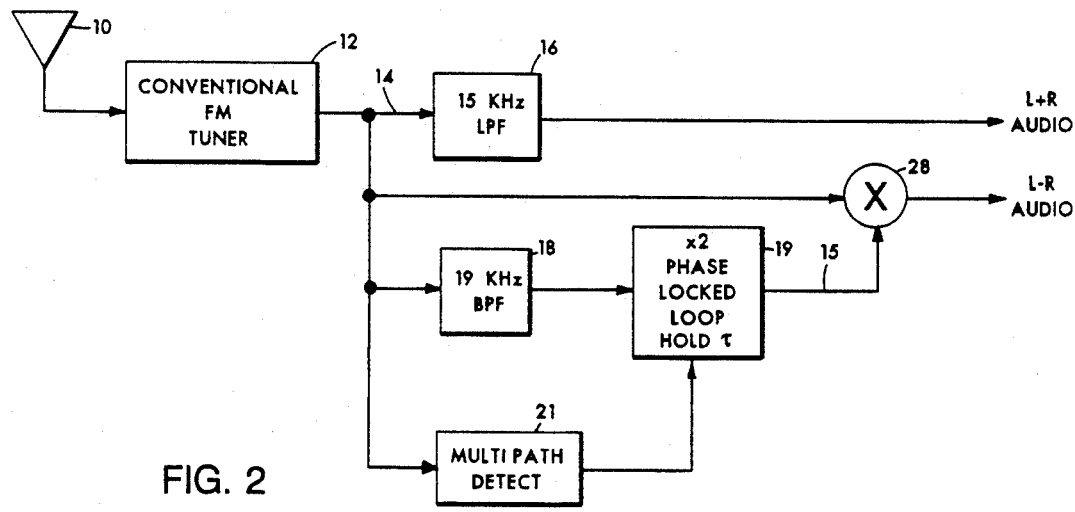
FIG. 2 is a block diagram of an embodiment of the invention which uses a slow PLL which has a time constant holding circuit.

Referring to FIG. 2, there is shown another embodiment of the invention in which PLL 19 has a hold for receiving a hold signal input which prevents the phase of the local subcarrier from changing in response to a signal on the output of multipath detection circuit 21 representative of multipath degradation. Multipath detection circuit 21 may comprise a high-pass filter and detector which detects the out-of-band noise in the composite signal, typically having spectral components about 100 kHz.

Figure 3:
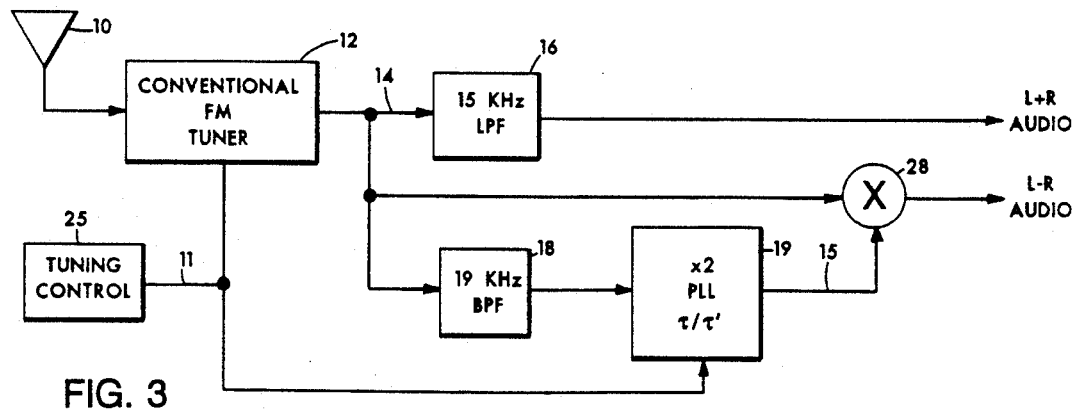
FIG. 3 is a block diagram of an embodiment of the invention in which the PLL has a short time constant when tuning and a longer time constant when tuned to a desired carrier frequency.

Referring to FIG. 3, there is shown another embodiment of the invention in which PLL 19 has a time constant control input for receiving a tuning signal on line 11 from tuning control 25 that changes the time constant in the feedback loop of PLL 19 to a shorter time constant $\tau'$ when tuning tuner 12 to a different carrier frequency. This feature allows the receiver to change stations and promptly reproduce stereo without distortion that would be introduced if the longer time constant $\tau$ prevented prompt locking on the phase of the pilot signal from the new station. This embodiment may be combined with the phase holding PLL embodiment of FIG. 2 described above to obtain a combination of benefits.

Figure 4:
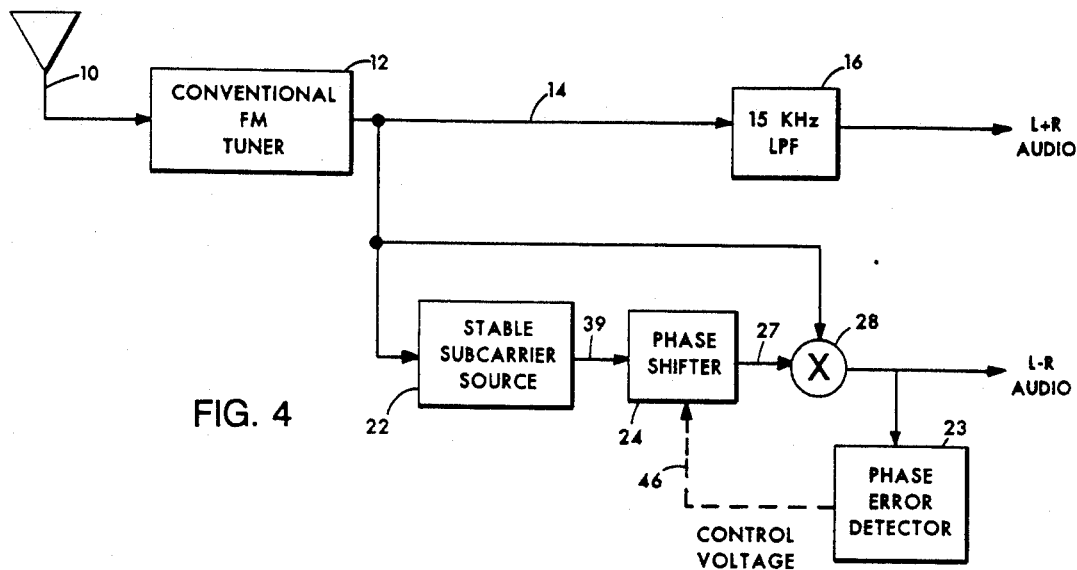
FIG. 4 is a block diagram of an alternative embodiment of the invention which uses a closed loop servo to adjust the phase of a local subcarrier.

Referring to FIG. 4, there is shown another embodiment of the invention especially useful when multipath degradation occurs for long time intervals. A stable local subcarrier source 22 provides a stable local subcarrier on line 39 that energizes controlled phase shifter 24 to provide a phase controlled local subcarrier on line 27. Phase error detector 23 responds to this signal on line 27 by providing a control signal on line 46 which is applied to the control input of phase shifter 24 to maintain the phase of the phase-controlled local subcarrier on line 27 substantially constant. This local subcarrier signal on line 27 energizes multiplier 28 to demodulate the difference signal in a conventional manner.

Figure 5:
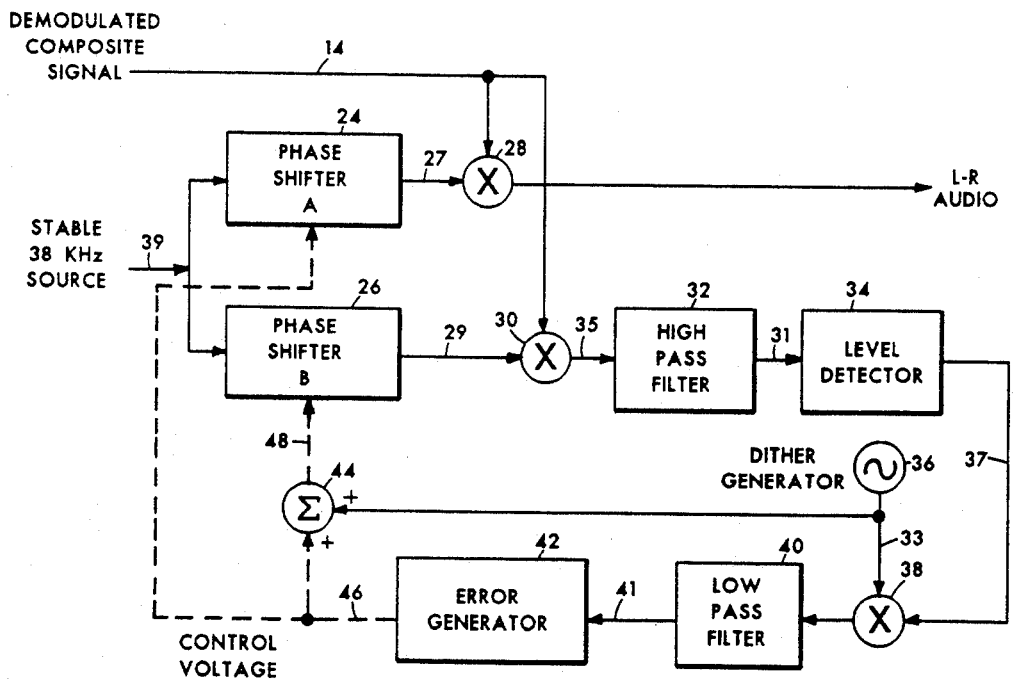
FIG. 5 is a block diagram of an embodiment of the invention which uses dithering in conjunction with a closed loop servo to adjust the phase of a local subcarrier.

Referring to FIG. 5, there is shown a block diagram of another embodiment of the invention that responds to multipath degradation by adjusting the phase of the local subcarrier to reduce the effects of multipath degradation. A stable 38 kHZ source on line 39 energizes voltage controlled phase shifter A (24) and voltage controlled phase shifter B (26). Phase shifter A receives a control voltage on line 46 from error generator 42. Phase shifter B receives a control voltage on line 48 from adder 44 energized by a signal on line 33 from dither generator 36 and the signal on line 46 from error generator 42. The output of phase shifter A on line 27 energizes a conventional DSB-SC demodulator 28, typically a multiplier that also receives the detected composite signal on line 14, to provide the L−R signal relatively free from the effects of multipath degradation.

Phase shifter B provides a 38 kHz signal on line 29 whose phase cyclically varies at the dither signal frequency. This signal on line 29 and the composite signal on line 14 feed a DSB-SC demodulator 30, preferably a four-quadrant multiplier to reduce out-of-band artifacts that might cause erroneous indication of phase error. The output on line 35 includes stereo difference channel audio and out-of-band noise representative of multipath degradation noise of variable level due to the phase dither having an envelope at the dither signal frequency.

The demodulator output on line 35 energizes high pass filter 32, typically having a cutoff frequency at 125 kHz or above to transmit only the out-of-band noise on line 31 to level detector 34. Level detector 34 detects the envelope of the signal on line 31 to provide a signal on line 37 of frequency of the dither signal, but of relative phase representative of the sense of the phase error of the local subcarrier. When the phase error is zero, the frequency of the signal on line 31 is twice the dither signal frequency. In order to determine the direction of the error, this signal 37 is synchronously demodulated using the original dither signal 33. This process is accomplished by multiplying the level detector output 37 by the original dither signal 33. Multiplier 38 combines the detected envelope on line 37 with the dither signal on line 33 to provide an output signal having a component representative of the sense of the phase error that energizes low pass filter 40. The output of low pass filter 40 on line 41 is the error signal that energizes error generator 42 to provide the control voltage on line 46.

The level of out-of-band noise depends not only on the phase error, but also on parameters such as the multipath conditions and modulation level; therefore, the magnitude of the error signal on line 41 varies with parameters other than the phase error. Error generator 42 may take a number of specific forms. It may comprise an integrator providing an output that ramps up and down at a constant rate when the error signal on line 41 is positive and negative respectively. When the error signal on line 41 is zero, indicating zero phase error, the integrator holds the output on line 46 and the amount of phase shift furnished by phase shifter A constant. An advantage of having the control signal delivered to phase shifter A be free of dither signal frequency spectral components is that the phase of the local subcarrier signal applied to multiplier 28 is free of these components to help reduce undesired audible artifacts in the demodulated L−R signal.

Figure 6:
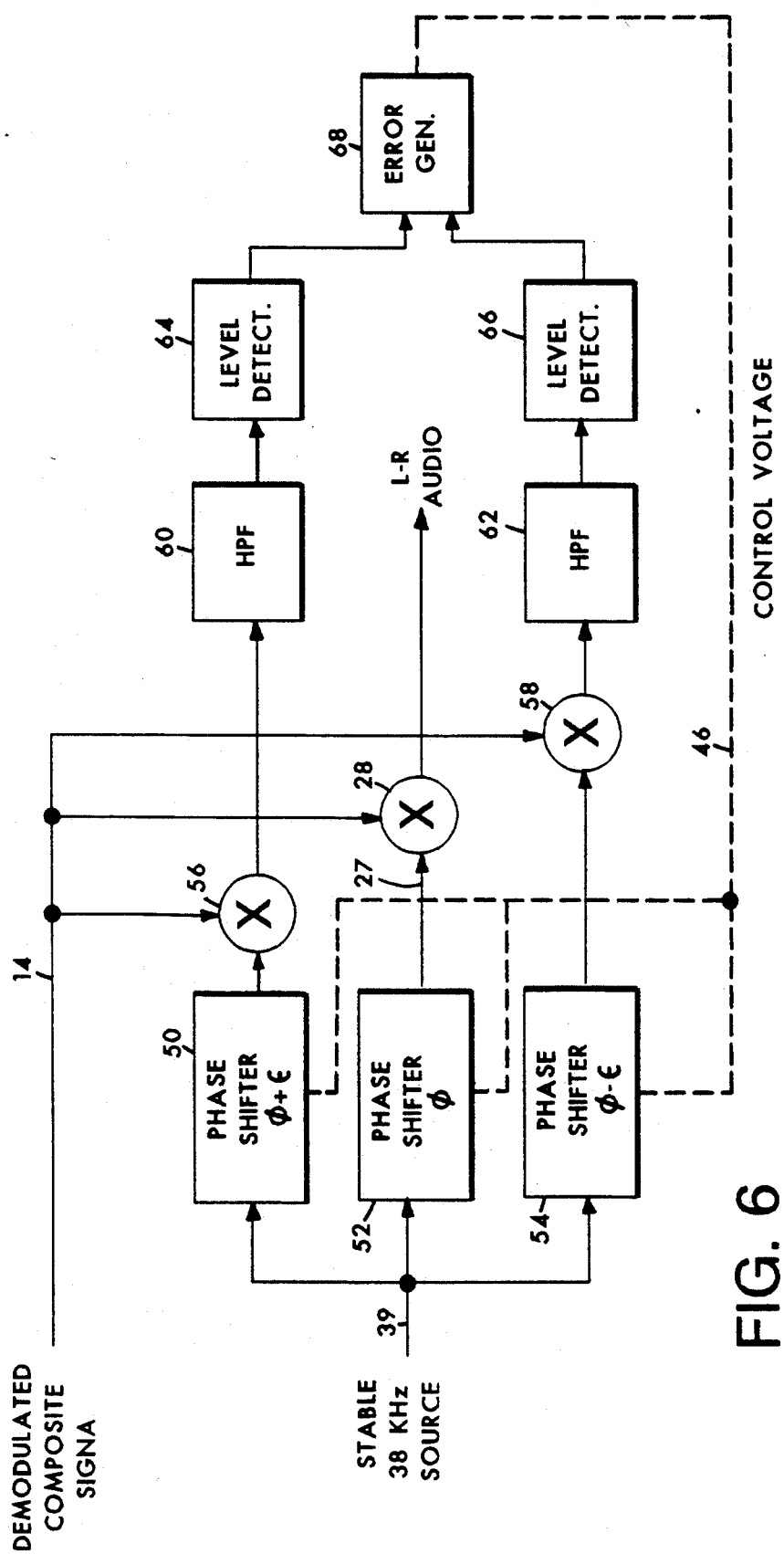
FIG. 6 is a block diagram of an embodiment of the invention which uses a pair of phase-shifted versions of the detected pilot carrier in conjunction with a closed loop servo to adjust the phase of the pilot carrier.

Referring to FIG. 6, there is shown another embodiment of the invention. Three phase shifters 50, 52, 54 energize three demodulators 56, 28, 58 respectively. Demodulators 56 and 58 energize level detectors 64, 66, respectively, through high pass filters 60, 62.

Phase shifter 50 furnishes a phase shift to the 38 kHz signal on line 39 in accordance with the control voltage on line 46, with an additional predetermined phase shift $\epsilon$. Phase shifter 52 furnishes a phase shift depending solely on the control voltage on line 46. Phase shifter 54 furnishes a shift depending on the control voltage 46, retarded by the predetermined shift ε. Demodulators 56, 58 are preferably four quadrant multipliers that combine the composite signal on line 14 with a respective local subcarrier from phase shifters 50, 54 to energize level detectors 64, 66, respectively, through high pass filters 60, 62, respectively to provide level representative of multipath degradation to error generator 68. Error generator 68 compares these levels to provide the control voltage on line 46.

When the out-of-band noise levels for the outside demodulators 50 and 54 are equal, the phase of the local subcarrier on line 27 corresponds to that of the transmitted pilot signal. Demodulator 28 combines the local subcarrier signal on line 27 with the composite signal on line 14 to provide the demodulated difference signal L−R essentially free of the effects of multipath degradation.

Thus, in the presence of multipath degradation, the invention reduces stereo difference signal demodulation errors which create a stereo soundstage anomalies, distortion and noise. This improvement is achieved by maintaining the local demodulating subcarrier in phase with the transmitted pilot signal.

Conventional multiplex decoders typically respond rapidly to changes in phase of the received pilot signal, typically using a PLL with a bandwidth in the hundreds of Herz. According to an important aspect of the present invention, changes in local subcarrier phase occur much more slowly with the PLL having a bandwidth typically less than 1 Hz and preferably much less than 1 Hz, except when first tuning in a station. A system according to the invention with a slow response is much less sensitive to the phase shift imparted by multipath to the received pilot signal as the receiver moves in and out of regions of multipath. As long as the signal at the receiver is not degraded by multipath for a significant length of time, this system provides significantly better performance than a typical multiplex decoder using a PLL with a broad bandwidth. A further improvement may reside in using a multipath detector which holds the phase of the local subcarrier signal until the multipath degradation ends.

If the received signal is more or less continually degraded by multipath, or if the multipath occurs for an extended period of time; e.g., while the receiver is stopped at a traffic light, it is advantageous to include a controllable phase shifter between the source of the stable local subcarrier signal and the multiplier that demodulates the DSB-SC difference channel signal. A close looped servo system may then control the phase shifter to adjust the phase to minimize the effects of multipath by minimizing the demodulation of the multipath-induced quadrature distortion products.

It is evident that those skilled in the art may now make numerous modifications and uses of and departures from the apparatus and techniques herein disclosed without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Apparatus for demodulating information signals frequency-modulated on a radio frequency carrier signal carrying spectral components within the audio frequency range, a pilot carrier signal having first imparted phase shift from the phase of the transmitted pilot carrier signal, and amplitude-modulated spectral components having a second imparted phase shift in a subcarrier channel frequency range above the audio frequency range to provide modulated radiated radio frequency signals, comprising:

a demodulator for demodulating the frequency-modulated information signals to provide a detected composite signal which includes a detected pilot carrier characterized by said first imparted phase shift in response to said modulated radiated radio frequency signals arriving at said apparatus over a plurality of paths of different lengths, and detected amplitude modulated spectral components in a subcarrier channel frequency range above the audio frequency range characterized by said second imparted phase shift in response to modulated radiated radio frequency signals arriving at said apparatus over a plurality of paths of different lengths;

a source of a local subcarrier signal, and a phase controller coupled to said source for controlling the phase of said local subcarrier signal to correspond substantially to that of the transmitted pilot carrier signal, and a combiner for combining said local subcarrier signal with said detected composite signal to recover the information signal carried by said amplitude modulated spectral components.

2. The apparatus of claim 1 wherein said phase controller includes a closed loop servo circuit.

3. The apparatus of claim 2 wherein said composite signal includes an out-of-band noise signal representative of multipath degradation and further comprising an out-of-band noise detector for providing a detected noise signal representative of said out-of-band noise signal.

4. The apparatus of claim 2 and further comprising a source of a dither signal of frequency in the very low audio frequency range, said closed loop servo circuit being coupled to said source of a dither signal.

5. The apparatus of claim 4 wherein said composite signal includes an out-of-band noise signal representative of multipath degradation and further comprising an out-of-band noise detector for providing a detected noise signal representative of said out-of-band noise signal, said closed loop servo circuit being coupled to said out-of-band detector and responsive to said detected noise signal.

6. The apparatus of claim 2 wherein said source of a local subcarrier signal comprises a source of a stable fixed frequency signal, and first and second controllable phase shifters coupled to the stable fixed frequency signal source and comprising said closed loop servo circuit that compares a pair of phase-shifted versions of said stable fixed frequency signal in order to adjust the phase of the fixed frequency signal source.

7. The apparatus of claim 3 wherein said source of a local subcarrier signal comprises a source of a stable fixed frequency signal, said first and second controllable phase shifters coupled to the stable fixed frequency signal source and comprising said closed loop servo circuit that compares a pair of phase-shifted versions of said stable fixed frequency signal in order to adjust the phase of the fixed frequency signal source.

8. Apparatus for demodulating information signals frequency-modulated on a radio frequency carrier signal carrying spectral components within the audio frequency range, a pilot carrier signal having a first intermittently imparted phase shift from the phase of the transmitted pilot carrier signal, and amplitude-modulated spectral components having a second intermittently imparted phase shift in a subcarrier channel frequency range above the audio frequency range, comprising:

a demodulator for demodulating the frequency-modulated information signals to provide a detected composite signal which includes a detected pilot carrier characterized by said first intermittently imparted phase shift in response to modulated radiated radio frequency signals arriving at said apparatus over a plurality of paths of different lengths, and to provide detected amplitude modulated spectral components in a subcarrier channel frequency range above the audio frequency range which spectral components are characterized by said intermittently imparted phase shift in response to modulated radiated radio frequency signals arriving at said apparatus over a plurality of paths of different lengths;

a source of a local subcarrier signal comprising a phase-locked loop adapted to lock onto said detected pilot carrier and having a first time constant long enough to maintain the phase of said local subcarrier signal corresponding substantially to that of the transmitted pilot carrier signal irrespective of said first and second intermittently imparted phase shifts;

and a combiner for combining said local subcarrier signal with said detected composite signal to recover the information signal carried by said amplitude modulated spectral components.

9. The apparatus of claim 8 further including:
a detector for detecting the occurrence of said intermittently imparted phase shifts, and
said phase-locked loop including a holding circuit for holding the phase of said local subcarrier signal unchanged when said intermittently imparted phase shifts are detected.

10. The apparatus of claim 9 wherein said composite signal includes an out-of-band noise signal representative of intermittently imparted phase shifts and further comprising
an out-of-band noise detector for providing a detected noise signal representative of said out-of-band noise signal,
said phase-locked loop being coupled to said out-of-band detector and being responsive to said detected noise signal.

11. The apparatus of claim 8 wherein:
said demodulator further includes a tuner for selecting said carrier frequency,
said phase-locked loop also having a selectable second time constant less than said first time constant, adjusting said tuner to select a carrier frequency causing said phase-locked loop to lock onto a detected pilot carrier in accordance with said second time constant shortly after selecting a carrier frequency.

12. The apparatus of claim 11 wherein said composite signal includes an out-of-band noise signal representative of intermittently imparted phase shifts and further comprising
an out-of-band noise detector for providing a detected noise signal representative of said out-of-band noise signal,
said phase-locked loop being coupled to said out-of-band detector and being responsive to said detected noise signal.

13. A method of demodulating information signals frequency-modulated on a radio frequency carrier signal having spectral components within the audio frequency range, a pilot signal having a first imparted phase shift from the transmitted pilot signal and an amplitude-modulated signal having spectral components having a second imparted phase shift in a subcarrier channel frequency range above the audio frequency range, comprising:

demodulating the frequency-modulated information signals to provide a detected composite signal which includes a detected pilot signal characterized by said first imparted phase shift and a detected amplitude modulated signal having an envelope and spectral components in said subcarrier channel frequency range above the audio frequency range characterized by said second imparted phase shift,
generating a local subcarrier signal and controlling the phase of said local subcarrier to correspond to that of said transmitted pilot signal,
and combining said local subcarrier signal and said composite signal to provide a detected audio signal corresponding to the envelope of said amplitude modulated signal.

14. The method of claim 13 wherein the step of controlling said phase includes detecting a characteristic representative of the difference between the phase of the local subcarrier signal and the phase of the transmitted pilot signal to provide an error signal,
and controlling the local subcarrier signal phase with said error signal to reduce said difference.

15. A method of demodulating information signals frequency-modulated on a radio frequency carrier signal having spectral components within the audio frequency range, a pilot signal having a first intermittently imparted phase shift from the transmitted pilot signal and an amplitude-modulated signal having spectral components having a second intermittently imparted phase shift in a subcarrier channel frequency range above the audio frequency range, comprising:

demodulating the frequency-modulated information signals to provide a detected composite audio signal which includes a detected pilot signal characterized by said first intermittently imparted phase shift and a detected amplitude modulated signal having an envelope and spectral components in a subcarrier channel frequency range above the audio frequency range characterized by said second intermittently imparted phase shift;
generating a local subcarrier signal,
controlling the phase of said local subcarrier signal to correspond to that of said transmitted pilot signal, while preventing phase change over a time interval long enough to prevent phase change during said first and second intermittently imparted phase shifts; and
combining said local subcarrier and said composite signal to provide a detected audio signal corresponding to said envelope.

16. The method of claim 15 further including the steps of:

detecting the occurrence of said intermittently imparted phase shifts, and maintaining the phase of said local subcarrier signal when said intermittently imparted phase shifts are detected.

17. The method of claim 15 further including the steps of:

tuning to a selected carrier frequency to receive a carrier at that selected carrier frequency, and allowing the phase of said local subcarrier signal to rapidly change during tuning so that the phase thereof may rapidly correspond to that of a transmitted pilot signal on said carrier.

18. Apparatus in accordance with claim 1 wherein said source of a local subcarrier signal comprises a phase-locked loop having a bandwidth less than 1 Hz.

19. Apparatus in accordance with claim 18 wherein the bandwidth of said phase-locked loop is much less than 1 Hz.

* * * * *

UNITED STATES PATENT AND TRADEMARK OFFICE
CERTIFICATE OF CORRECTION

PATENT NO. : 5,241,687
DATED : August 31, 1993
INVENTOR(S) : William R. Short

It is certified that error appears in the above-indentified patent and that said Letters Patent is hereby corrected as shown below:

Column 8, line 61, "said" should be --and--.

Signed and Sealed this

Thirty-first Day of May, 1994

Attest:

BRUCE LEHMAN

*Attesting Officer*     *Commissioner of Patents and Trademarks*